Oct. 11, 1938.   J. MIHALYI   2,132,695
ROLL HOLDING CAMERA
Original Filed Oct. 30, 1936   2 Sheets-Sheet 1

Joseph Mihalyi
INVENTOR.

BY
ATTORNEYS.

Oct. 11, 1938.  J. MIHALYI  2,132,695
ROLL HOLDING CAMERA
Original Filed Oct. 30, 1936    2 Sheets-Sheet 2

Joseph Mihalyi
INVENTOR.
BY
ATTORNEYS.

Patented Oct. 11, 1938

2,132,695

UNITED STATES PATENT OFFICE 2,132,695

ROLL HOLDING CAMERA

Joseph Mihalyi, Rochester, N. Y., assignor to Eastman Kodak Company, Rochester, N. Y., a corporation of New Jersey Original application October 30, 1936, Serial No. 108,397, now Patent No. 2,090,060, dated August 17, 1937. Divided and this application June 23, 1937, Serial No. 149,873

7 Claims. (Cl. 95—32)

This invention relates to photography and particularly to cameras utilizing roll film.

One object of my invention is to provide a camera with a novel type of film winding mechanism and to provide a means for simultaneously setting the shutter during the film winding operation. Another object of my invention is to provide a camera in which most of the operating parts of the camera are enclosed in one or more casings and to provide a simple type of operating means for the mechanisms contained in the shutter casing. Another object of my invention is to provide a camera which may be of a relatively complex type with an extremely simple form of control which will greatly reduce the liability of improper operation. A still further object of my invention is to provide a camera with a built-in shutter of the setting type, to totally enclose the shutter setting mechanism and to provide a single lever for both setting the shutter and winding the film, and other objects will appear from the following specification the novel features being particularly pointed out in the claims at the end thereof.

Coming now to the drawings wherein like reference characters denote like parts throughout:

Figure 1:
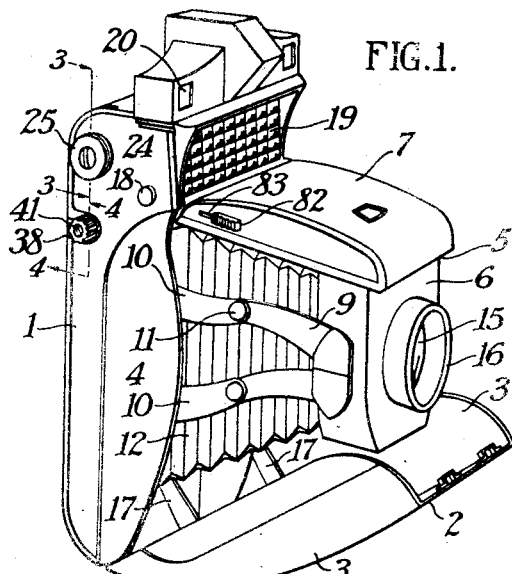
Fig. 1 is a perspective view of a camera constructed in accordance with and embodying my invention.

In my Patent No. 2,090,060, granted August 17, 1937, for "Double exposure prevention camera", of which this application is a division, I have shown and illustrated a camera in which the film winding mechanism required one full stroke during the first part of the movement of the film winding to operate suitable interlocking mechanism by which the film winding shutter setting and shutter releasing mechanisms were connected. In the present application, the claims are particularly directed to the lever rewind and to the connections between the lever rewind and film winding shaft and the lever rewind and the shutter setting member, the specific structures of these parts being included in the present application.

Many of the higher grade cameras now on the market include one of the known types of so-called setting shutters—that is, a shutter having a power spring which must be placed under tension before this shutter can be operated. Such shutters have a trigger which, through a latch, is adapted to hold the shutter mechanism in a set position with the shutter spring under tension until the trigger is released. Pressure on the trigger, except when the shutter spring has been tensioned, does not affect the shutter.

In cameras employing such shutters, the normal operation of the camera requires that the film be wound, the shutter be set, and the trigger be operated in proper timed sequence to make an exposure. In my present application, I have reduced the number of operations by combining the film winding and shutter setting movements, and by totally enclosing the shutter setting mechanism, the operator uses the camera exactly the same as if the shutter were of the so-called automatic type in which pressure on the trigger both sets the shutter spring and releases the shutter.

It is obvious that my invention is useful on any type of camera whether the camera be of the box type, the folding type, or of any of the so-called miniature camera types and while I have illustrated as a preferred form of my invention a folding type of camera, it is to be understood that my invention is not limited to this type of camera.

In order to carry out my invention, it is only necessary to have a camera housing in which the operating parts may be enclosed. Such a housing may be a unitary box type of camera housing or the housing may be made in several parts as shown in the preferred embodiment illustrated. However, where I refer to camera housing in the following specification and claims, I mean either a single enclosure for the operating parts of the camera, or a plurality of casings which may be arranged so as to fold to and from an open or operative position.

In the embodiment illustrated, the camera may consist of a body portion 1 to which a bed 2 is hinged, the bed having side flanges 3 adapted to telescope the recess portions 4 of the side of the camera when the camera is folded. This camera preferably carries a shutter which is made in two parts and which is designated broadly as 5. This shutter is fully described and claimed in my copending application Serial No. 108,396, filed October 30, 1936, and only such parts of the shutter as are necessary for a complete understanding of this invention are shown in connection with this application.

The shutter is contained in two casings, one part, 6, forming the camera front, and the other part, 7, being hinged to the camera body on a pintle 8.

The camera front 6 is preferably supported by similar pairs of lazy tongs 9 and 10 pivotally connected at 11, the pivotal points of which separate in a well known manner as the front 6 is moved parallel to the camera body into a folded position. A bellows 12 connects the usual exposure frame and the camera front 6.

Figure 2:
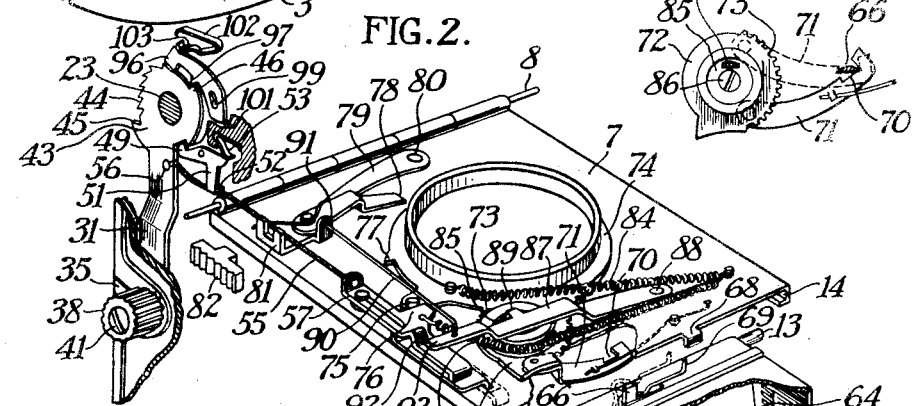
Fig. 2 is a fragmentary perspective view of some of the shutter parts which are shown in the drawing in a partially separated position, to best illustrate the working elements carried by these parts.

Referring to Fig. 2, the camera front 6 is provided with a pair of shafts 13 which are shown removed from, but which nevertheless slide in the overturned flanges 14. Thus, during the opening movement of the camera, the pins 13 slide in the tracks 14 and the casing 7 swings about its hinge 8 as the camera front 6 is moved to an operative position.

The camera front 6 may be provided with an objective 15 and in the form shown, focusing is accomplished by turning the front lens cell 16 in a manner well known in the art.

The camera bed 2 may be supported in its open position by bed braces 17 which may be released by pressing the push button 18 on the side walls of the camera.

While not important for the present invention, the camera is preferably equipped with a light-sensitive meter 19 for measuring the light and for automatically adjusting parts of the camera mechanism, and may be equipped with a range finder 20. As thus far described, the parts are not essential to my present invention.

Figure 3:
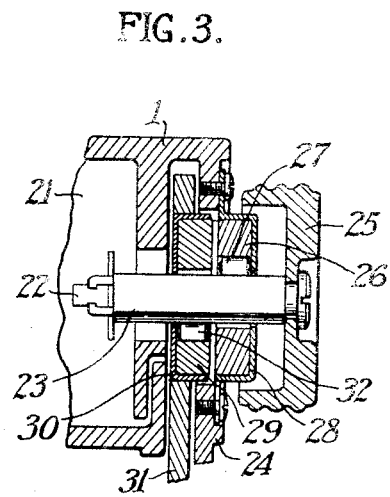
Fig. 3 is a fragmentary detail section through the winding key post and its support, taken on line 3—3 of Fig. 1.

Coming now to the invention to be claimed herein, the winding mechanism will be described first. As indicated in section in Fig. 3, the camera body 1 is provided with a spool chamber 21 in which a winding key flange 22 of the usual type is employed to engage the slot in a film spool. This flange is carried by a shaft 23 passing entirely through the side wall 24 of the camera and terminating in a knob 25. The support for the shaft 23 in the side wall of the camera consists of a one-way clutch 26 of a known type in which a roller 27 lies in an arcuate race, so that it will bind and prevent the shaft from turning in one direction, and so that it will run freely and permit the shaft to turn in an opposite direction. This clutch member is held in place by a casing 28. The clutch is similar to the clutch shown in Fig. 7, wherein the key shaft 23 passes through the clutch 29 carried by a casing 30 on the winding arm 31. This clutch, like the one above described, consists of a roller 32 movable in an arcuate race 33, so as to bind and cause the shaft to turn in the direction shown by the arrow when the winding arm 31 is moved in a clockwise direction with regard to Fig. 7, this roller releasing the shaft when the arm is turned in an opposite direction.

Figure 6:
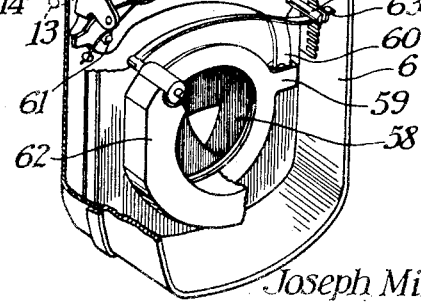
Fig. 6 is a detail plan view of the shutter leaf driving mechanism.
Figures 4, 5:
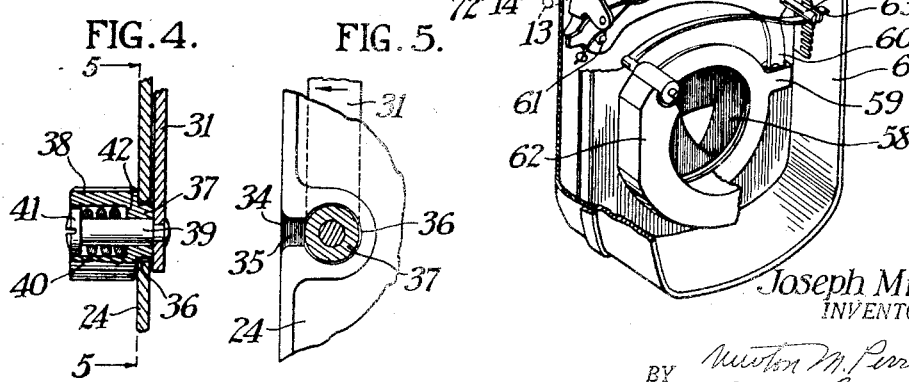
Fig. 4 is a fragmentary section on line 4—4 of Fig. 1.
Fig. 5 is a fragmentary side elevation partially in section of the winding arm latch.

The arm 31, which is an oscillatable part which can be moved back and forth to wind film, moves between two limits of movement, the upper limit is defined by stops which will be later described, and the lower limit, or the normal position of rest, being determined by the latch seat 34. Referring to Figs. 5 and 6, it will be seen that the side wall 24 of the camera is provided with an opening having a narrow neck 35 and an enlarged area 36 adapted to receive the annular shank 37 of the winding handle 38. The winding handle is held to the arm 31 by means of a post 39 surrounded by a coiled spring 40 which bears against the head of the post 41 and a shoulder 42 in the handle. Thus, by drawing out upon the handle 38, the spring is compressed and the cylindrical portion 37 can be drawn out of the annular recess 36 so that the handle 31 may be turned to wind film.

Figure 7:
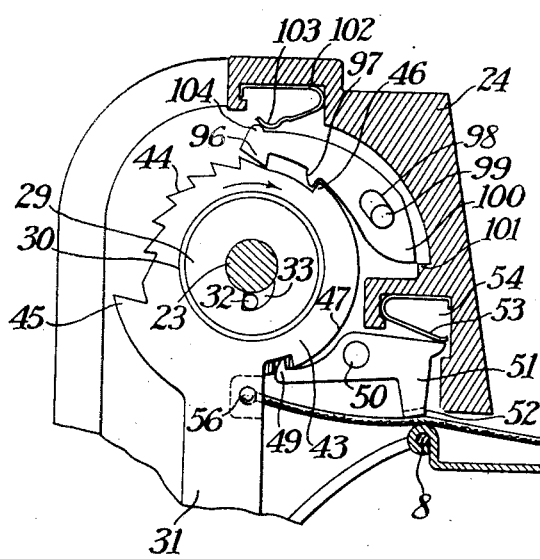
Fig. 7 is a fragmentary side elevation partially in section showing the film winding structure and its connection to the shutter.

However, it is desirable to lock the film winding mechanism against movement until an exposure has been made. To accomplish this, the following mechanism is employed: Referring to Fig. 7, it will be seen that the winding arm 31 is provided with an enlarged head 43, a part of which 44 has been provided with ratchet teeth, a lug 45, a shoulder 46, an arcuate surface 47 and a notch 48.

The notch 48 is designed to latch the handle 31 against movement until the shutter parts are in a predetermined position. This is accomplished in the following manner: The notch 48 is adapted to receive a hook 49 of a latch member pivoted at 50 and having an arm 51 with an inwardly turned flange 52. A spring 53, in a recess 54, tends to press the latch into the latching position shown in Fig. 7.

Figure 8:
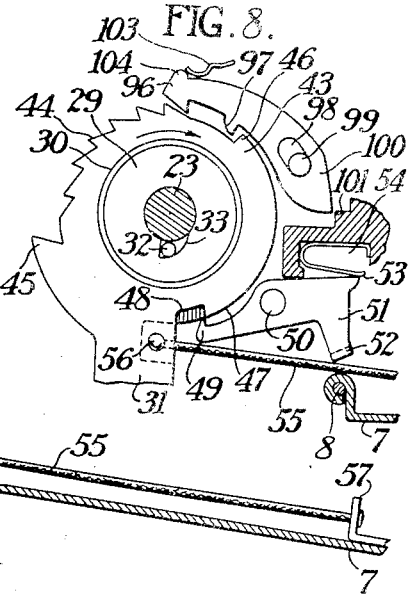
Figs. 8, 9 and 10 are fragmentary views similar to Fig. 7, but with parts shown in a series of different positions to illustrate the functions of the various elements.

However, the latch can be moved from this position by means of a flexible connection 55 attached to the winding arm at 56 and attached to a slide 57 which forms a part of the shutter. When the flexible connection 55, which may be in the form of a cable or chain, is drawn taut, as indicated in Fig. 8, it presses upon the overturned end 52 of the pivoted latch member and swings the hook 49 from its operative engagement with the notch 48.

Thus, the arm 31 is released, and by pulling out the handle 38 and moving the arm 31, film can be wound, subject to other conditions which will be later described. As indicated in Fig. 8, during the winding movement the latch member 49 rides idly over the arcuate surface 47, but when the winding has been completed and the handle 40 returned to its normal position of rest, the latch member 49 will be in position to engage the notch 48.

A few of the shutter parts necessary to understand this invention will be described next. However, the complete shutter is fully shown and described in my copending application above referred to.

In the shutter front 6 I prefer to mount the diaphragm which is here shown as consisting of leaves 58, many of which have been omitted for the sake of clearness, which can be opened and closed by turning the diaphragm ring 59, this ring being attached to an arm 60 pivoted at 61 so that this arm can move and can be controlled by the light intensity measured by the light sensitive element lying behind the lenses 19. Light falling on the light sensitive element after passing through the lenses 19 actuates the meter 62, so that the arm 63 swings freely, and just before an exposure is made the comb-like member 64, which passes through the slotted guide post 65, engages the arm, and by swinging the lever 60 until it engages the meter arm 63, the diaphragm is automatically set in accordance with the prevailing light conditions. This structure is more fully described in my copending application Serial No. 106,552, filed October 20, 1936.

The shutter leaves which lie behind the diaphragm leaves 58 may be actuated in a known manner by the post 66 which is held against movement by a spring latch 67 until the shutter front slides to its outermost position as the pins 13 move through the guideways 14. At its outer position a lug 68 on the member 7 engages the upstanding end 69 of the spring latch and swings it to the position shown in dotted lines, in which the post 66 is released. However, by this time the post 66 has become engaged by the notch 70 of the driving arm 71 which is attached to the driving member 72, this member being driven through a gear 73 from a shutter setting member 74.

The driving member 72 is driven through somewhat more than 90°, moving the arm 71 rapidly back and forth to open and close the shutter blades in a known manner. During the setting movement, as illustrated in Fig. 6, the hook-like member 70 rides past the post 66 idly, and consequently does not open and close the shutter while the shutter is being set.

In order to set the shutter, the setting member 74 is provided with a post 75 which lies in the path of a lug 76 on the slide 57, which is connected to the winding arm 31 by the flexible connection 55. Consequently, when the winding arm 31 is moved to wind the film lug 76, through engagement with pin 75, turns the ring 74 until the lug 77 engages the latch 78 which is pivoted to 7 on the end of a trigger member 79 by a stud 80 and having a fork 81 adapted to be engaged by the shutter trigger release member 82. Thus, when the shutter trigger is moved in its slot 83 (Fig. 1) toward the camera body, the trigger 78 releases the lug 77, and the ring 74 will rapidly turn under the impulse of spring 84. This, through the driving member 72 and arm 71, will open and close the shutter.

There is no need to describe in detail the timing mechanism by which various different times of exposures can be produced because this is the subject of my copending application Serial No. 106,552 above referred to.

From Fig. 6 it should be noted that the driving member 72 has a groove 85 extending around its central pivot 86. The reason for this groove is that the arm 87, which is pivoted at 88 to member 7, is provided with a downwardly extending lug 89 which extends into the groove 85. Since arm 87 is connected by the member 90 to the trigger 79, being attached thereto by means of the lug 91, the trigger cannot move unless the arm 87 moves.

Consequently, if an effort is made to move the trigger 82, and the lug 89 lies in the groove 85, the trigger will not release the shutter. The reason for this is as follows: If the film has not been fully wound, and consequently, if the handle 38 should not be in its normal position of rest, in which it engages and spring latch 36—37, the slide 57 will not have returned to its lowermost position. Consequently, the cam surface 92 will not have raised the end 93 of the lever 87 and removed lug 89 from the groove 85. Therefore, it is necessary to return the winding lever to its position of rest before an exposure can be made.

It should be noted that the slide 57 is normally moved toward the shutter front by means of a spring 94, but the action of this spring is not sufficiently strong to release the latch 48—49, and this can only be done by the pin 75 of the shutter setting member coming to its normal position of rest against the lug 76. Thus, when an exposure had been made and ring 74 moves under the impulse of spring 84, the pin 75 swings quickly around and sharply strikes the lug 76, drawing the flexible connection 55 taut and releasing the latch 48—49.

If it were only necessary to return the winding arm 31 to its initial position of rest before making an exposure, it would be possible to make an exposure without fully winding the film. With this type of winding mechanism, the arm must be oscillated back and forth a number of times before the film is wound. However, with the mechanism which will now be described, it is necesasry to move the arm 31 one complete stroke before it can be returned to its initial position of rest. Consequently, if an operator starts to wind film, it is thought there is a very little chance that the film would be left incompletely wound.

Again referring to Figs. 7 to 10, inclusive, the structure which prevents the arm from being returned to its normal position of rest until the first full stroke of the arm is made is as follows: The ratchet teeth 44 on the enlarged end 43 of the arm 31 are adapted to be engaged by a pawl member 96. This pawl member is provided with a downwardly extending lug 97, a slot 98, which turns on and slides about a pin 99, and a tail 100, which is adapted to either swing above or engage the inwardly extending projection 101. A spring 102 normally presses the pawl towards the ratchet teeth, and the spring is provided with a grooved end 103 which is adapted to retain the pawl in a set position upon its pivot 99, since a rounded projection 104 on the pawl is adapted to be engaged by the spring projection 103, which may rest on either side of the projection 104. Fig. 7 shows one position and Fig. 10 shows the other.

With the parts in the position shown in Fig. 7, as soon as the flexible cable 55 is drawn taut, and the arm 31 released, the arm may be swung in a clockwise direction while the pawl 96 snaps over the ratchet teeth 44.

Figure 9:
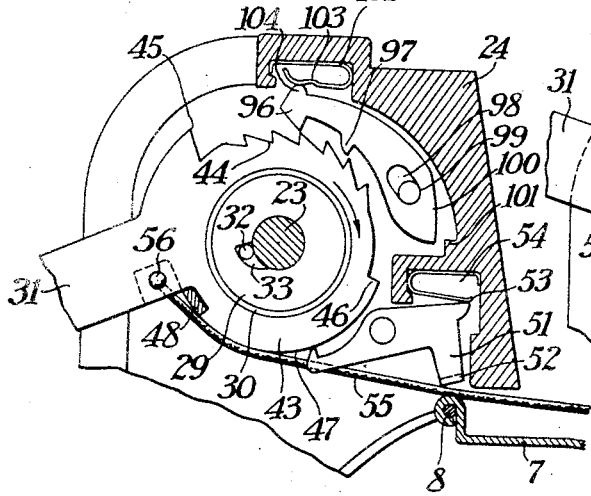
Figure 10:
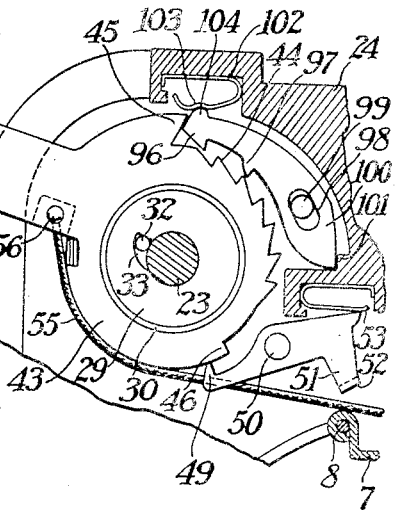

Should the operator turn the arm 31 only to the position shown in Fig. 9, if he attempted to return the arm to its position of rest in a counterclockwise direction, the pawl 96 would engage a ratchet tooth 44 and would prevent this return movement. Accordingly, the operator would again turn the arm 31 to its upper extent of movement indicated in Fig. 10, in which the shoulder 45 engages the end 96 of the pawl, moving it upon the pivot 99 until the tail 100 is engaged behind the shoulder 101. In this position the pawl member is held out just beyond the end of the ratchet teeth 44 so that the arm may be now turned in counter-clockwise direction without being obstructed by the pawl.

The operator may now make as many strokes as he desires, and these may be either full strokes or part strokes. As he oscillates the lever 31 he watches the film number appear in the usual red window in the camera back and stops the winding operation at any desired point, after which he swings the handle down to its normal position of rest, seating the latch members 36 and 37. Just before this seating operation occurs, flange 46 strikes lug 97 on the pawl and moves it upon the stud 99 back to the initial position shown in Fig. 7. In this position the latch 48—49 likewise becomes engaged.

It will thus be seen that it is necessary to make one full winding stroke with the handle 31 in order to release the pawl 96. Consequently, the film operation must actually be started before the arm 31 can be returned to its initial position of rest, and before it is in position to permit the flexible connection 55 to raise the latching arm 87 to remove the lug 89 from the groove 85, and consequently permit the shutter trigger to be operated.

There is an additional reason for requiring arm 31 to make one full stroke in winding a film into place. Unless this arm is moved to its upper limit of movement, which is defined by the engagement of projection 45 with the end of the pawl 96, the flexible connection 55 will not cause the slide 57 to move far enough for the shutter setting member 77 to engage the trigger 78. Consequently, it is during this first full stroke of the winding lever that the shutter is set. The flexible connection 55 thus provides a lost motion connection permitting free movement of the handle 38 in the same direction after its first full stroke without affecting the shutter setting member 77. After the shutter has once been set, the cable is free to flex so that due to the yielding of this cable, further movement of the winding handle is permitted, and it may be moved a number of times if desired or necessary for winding a fresh film into place.

After the winding operation has been completed and the winding arm returned to its normal position of rest, the shutter trigger is unlatched for operation and an exposure can be made.

While the structure of the camera and shutter above described is not a particularly simple one, nevertheless, from the standpoint of the operator, it is a very simple camera to operate. Moreover, since this camera employs the setting type of shutter, a large variety of accurately timed exposures can readily be obtained. The setting mechanism of the shutter, being entirely enclosed in the camera casing, does not require any particular attention from the operator as the oscillatable lever lug 75 is automatically moved to tension the shutter spring 84 by merely winding the oscillatable lever winding handle 38 between its two stops or limits of motion, one being illustrated in Fig. 7 and the other being illustrated in Fig. 10. Thus, the movement of handle 38 causes the lost motion connection lug 76 and lug 75 to engage and move the master member 74 until the latch 77—78 comes into engagement at which time the spring 84 is held under compression. However, the lug 76 then moves away from the lug 75 under the impulse of the spring 94 as the winding handle 38 is returned to its original position of rest.

The particular structure above described readily lends itself to a camera mechanism which can be totally enclosed in a camera casing with a minimum number of manually operable parts extending through the casing to an accessible position outside of the casing. While I have described a preferred embodiment of my invention, it is to be understood that I am limited only as indicated in the appended claims.

What I claim:

1. In a roll holding camera, the combination with a camera body including a housing enclosing spool chambers and an exposure frame, mechanism for operating the camera enclosed in the housing including a rotatble shaft for turning a spool in a spool chamber, a one-way clutch between said shaft and camera housing preventing movement of the shaft in one direction, a lever for turning the film spool shaft, a one-way clutch between said lever and shaft, a handle on the outside of the casing for operating said lever, a spring operated shutter of the setting type carried by the camera and enclosed in the casing, a totally enclosed setting lever for tensioning the spring of the shutter, a shutter trigger extending through the shutter casing to the outside hereof, and totally enclosed lost motion connections between the film winding handle and shutter setting lever whereby the latter may only be operated by the former.

2. In a roll holding camera, the combination with a camera body including a housing enclosing spool chambers and an exposure frame, mechanism for operating the camera enclosed in the housing including a rotatable shaft for turning a spool in a spool chamber, a one-way clutch between said shaft and camera housing preventing movement of the shaft in one direction, a lever for turning the film spool shaft, a one-way clutch between said lever and shaft, a handle on the outside of the casing for operating said lever, a spring operated shutter of the setting type carried by the camera and enclosed in the casing, a totally enclosed setting lever for tensioning the spring of the shutter, and movable between two limits of movement, means for limiting the stroke of the lever for turning the film comprising two stops, a lost motion connection between the film winding lever and shutter setting lever for moving the latter through its full stroke for setting the shutter by means of moving the film winding handle between the two stops.

3. In a roll holding camera, the combination with a camera body including a housing enclosing spool chambers and an exposure frame, mechanism for operating the camera enclosed in the housing including a rotatable shaft for turning a spool in a spool chamber, a one-way clutch between said shaft and camera housing preventing movement of the shaft in one direction, a lever for turning the film spool shaft, a one-way clutch between said lever and shaft, a handle on the outside of the casing for operating said lever, a spring operated shutter of the setting type carried by the camera and enclosed in the casing, an oscillatable lever for setting the shutter, a shutter spring adapted to be tensioned by the oscillatable lever, a latch for holding the oscillatable lever in set position, a shutter trigger for releasing said latch, a lost motion connection between said oscillatable shutter setting lever and the film winding handle for turning the former from the latter to a latched position, and a spring for normally holding the film winding handle in a predetermined position of rest.

4. In a roll holding camera, the combination with a camera body including a housing enclosing spool chambers and an exposure frame, mechanism for operating the camera enclosed in the housing including a rotatable shaft for turning a spool in a spool chamber, a one way clutch between said shaft and camera housing preventing movement of the shaft in one direction, a lever for turning the film spool shaft, a one-way clutch between said lever and shaft, a handle on the outside of the casing for operating said lever, a spring operated shutter of the setting type carried by the camera and enclosed in the casing, an oscillatable lever for setting the shutter, a shutter spring adapted to be tensioned by the oscillatable lever, a latch for holding the oscillatable lever in a set position, a shutter trigger for releasing said latch, a lost motion connection between said oscillatable shutter setting lever and the film winding handle for turning the former from the latter to a latched position, a spring for normally holding the film winding handle in a predetermined position of rest, a latch operating on said lever for retaining it in said position of rest, and means for releasing said latch through the oscillatable shutter setting lever moving under the influence of its spring by operating the shutter trigger.

5. In a roll holding camera, the combination with a camera body including a housing enclosing spool chambers, of a film winding shaft extruding into one spool chamber, an oscillatable lever mounted to turn on the camera body, at least a portion of said lever extending through said camera housing to the outside thereof for manual operation, a shutter enclosed in the camera housing, a shutter trigger extending through the camera housing to the outside thereof for manual operation, an oscillatable shutter setting lever totally enclosed in the shutter housing and adapted to set a shutter spring when moved, and a lost motion connection between the shutter setting lever and the film winding lever whereby the latter constitutes the sole means for moving the former.

6. In a roll holding camera, the combination with a camera body including a housing enclosing spool chambers, of a film winding shaft extending into one spool chamber, an oscillatable lever mounted to turn on the camera body, at least a portion of said lever extending through said camera housing to the outside thereof for manual operation, a shutter enclosed in the camera housing, a shutter trigger extending through the camera housing to the outside thereof for manual operation, an oscillatable shutter setting lever totally enclosed in the shutter housing and adapted to set a shutter spring when moved, a lost motion connection between the shutter setting and film winding shaft and comprising interengaging lugs, a longitudinally slidable bar, and means for simultaneously moving the bar longitudinally as the film winding shaft rotates, and a manually oscillatable member at least part of which is mounted on the exterior of the camera casing for both winding the film and setting the shutter.

7. In a roll holding camera, the combination with a camera body including a housing enclosing spool chambers and an exposure frame, mechanism for operating the camera enclosed in the housing including a rotatable shaft for turning a spool in a spool chamber, a one-way clutch between said shaft and camera housing preventing movement of the shaft in one direction, a lever for turning the film spool shaft, a one-way clutch between said lever and shaft, a handle on the outside of the casing for operating said lever, a spring operated shutter of the setting type carried by the camera and enclosed in the casing, a totally enclosed setting lever for tensioning the spring of the shutter, a shutter trigger extending through the shutter casing to the outside thereof, and totally enclosed lost motion connections between the film winding handle and shutter setting lever and comprising two interengageable lugs, one operable directly with the shutter setting lever, and a spring for moving the last mentioned lug from the other lug after the shutter is set.

JOSEPH MIHALYI.